US011533484B1

(12) United States Patent
Anumula et al.

(10) Patent No.: US 11,533,484 B1
(45) Date of Patent: Dec. 20, 2022

(54) METHOD AND SYSTEM FOR OPTIMIZING IMAGE AND VIDEO COMPRESSION FOR MACHINE VISION

(71) Applicant: TERAKI GmbH, Berlin (DE)

(72) Inventors: Jithendar Anumula, Berlin (DE); Bernhard Kaplan, Berlin (DE); Daniel Lampert Richart, Berlin (DE)

(73) Assignee: TERAKI GMBH, Berlin (DE)

( * ) Notice: Subject to any disclaimer, the term of this patent is extended or adjusted under 35 U.S.C. 154(b) by 0 days.

(21) Appl. No.: 17/376,547

(22) Filed: Jul. 15, 2021

(51) Int. Cl.
*H04N 19/124* (2014.01)
*H04N 19/186* (2014.01)
*G06V 20/56* (2022.01)

(52) U.S. Cl.
CPC ........... *H04N 19/124* (2014.11); *G06V 20/56* (2022.01); *H04N 19/186* (2014.11)

(58) Field of Classification Search
CPC ..... H04N 19/124; H04N 19/186; G06V 20/56
See application file for complete search history.

(56) References Cited

U.S. PATENT DOCUMENTS

2018/0107926 A1\* 4/2018 Choi .................... G06N 3/0472
2022/0044114 A1\* 2/2022 Sriram .................. G06N 3/063

\* cited by examiner

*Primary Examiner* — Jae N Noh

(57) ABSTRACT

A method and a system described herein provide optimizing image and/or video compression for machine perception. According to an aspect, the method comprises receiving a raw image frame from a camera sensor; detecting a predefined object in the raw image frame and marking a region around the predefined object within the raw image frame as ROI. Based on the ROI, a partitioning scheme, a prediction mode, and quantization parameter are determined for improving coding efficiency. Machine perception efficiency is improved by selecting a quantization parameter table used for compressing and encoding the raw image or video frame based on a selected machine vision task. The selection of the quantization parameter table is based on training of the selected machine vision task using cost function optimization.

20 Claims, 11 Drawing Sheets

METHOD AND SYSTEM FOR OPTIMIZING IMAGE AND VIDEO COMPRESSION FOR MACHINE VISION

BACKGROUND

With the rise of remote and autonomic driving, the amount of image data which is streamed and processed is ever increasing. Therefore, optimizing data processing and machine vision tasks such as semantic segmentation, object detection, time of interest detection, etc. is required to be optimized.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Computer-implemented methods and systems are described herein provide for optimizing image and/or video compression for machine perception. A method and a system described herein provide optimizing image and/or video compression for machine perception. According to an aspect, the method comprises receiving a raw image frame from a camera sensor; detecting a predefined object in the raw image frame and marking a region around the predefined object within the raw image frame as a region of interest (ROI). Based on the ROI, a partitioning scheme, a prediction mode, and quantization parameter are determined for improving coding efficiency. Machine perception efficiency is improved by selecting a quantization parameter table used for compressing and encoding the raw image or video frame based on a selected machine vision task. The selection of the quantization parameter table is based on training of the selected machine vision task using cost function optimization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive examples are described with reference to the following figures.

DETAILED DESCRIPTION

Figure 1:
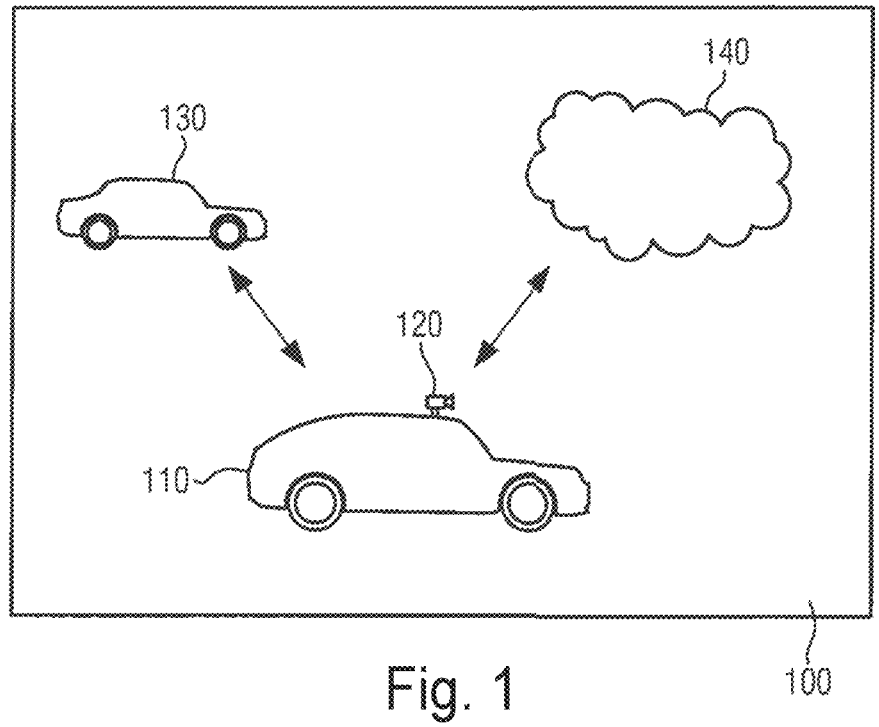
FIG. 1 is a diagram illustrating a system comprising a vehicle, a corresponding camera, another vehicle and a cloud environment.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense. Aspects of the present disclosure relate to systems and methods for optimizing image and video compression and coding in the field of machine vision. Aspects of the present disclosure further relates to methods and systems for optimizing the image and video pre-processing for downstream machine vision tasks on images/videos.

Video compression methods play an important role both in storage and transmission of visual data. The amount of uncompressed video data is too large for limited transmission bandwidth or storage capacities. For example, to store a 2 hours uncompressed video of full High Definition (HD) resolution frames (1920×1080 pixels), a capacity of 2 (hours)×60 (minutes per hour)×60 (seconds per minute)×25 (frame rate, frames per second)×1920×1080 (frame size in pixels)×3/2 (number of bytes per pixel)=559,872 GB is required, which far exceeds the capacity of current optical disc storage (50 GB for dual layer Blue-ray Disc). With efficient compression techniques, a significant reduction in amount of video data can be achieved with little or no adverse effect on the visual quality.

Video compression is the art of reducing video data size without losing important visual details in the video frames. The state-of-the-art standard based video codecs such as H.264/AVC, H.265/HEVC, H.266/VVC, VP9, AV1 etc. achieve much higher coding efficiency mainly due to better exploitation of the spatial-temporal correlation that may exist between successive video frames and reducing the statistical redundancy in the video signal. All of these video codecs, however, are optimized for the subjective human perception and remove redundancy in the video signal not perceivable by humans. Furthermore, all of these codecs in principle assume that all objects in the video frame or all parts of the video frame are equally important and, therefore, allocate bits accordingly.

In a typical autonomous driving (AD), remote driving (RD) and Advanced Drivers' Assistance Systems (ADAS) use cases, good quality video from the cameras attached to a vehicle is of paramount importance for tasks involving the perception of the vehicle's surroundings.

While there are multiple lossy compression standards for images, DCT based compression remains the most popular, of which the JPEG (or JPG) standard is the most widely used one. Similarly, for videos, DCT-based compression standards remain the most widely used, with H.264 used by more than 90% of the industry developers. In such compression schemes, the data reduction is achieved through quantization.

In view of the above, aspects of the present disclosure provide several embodiments for an improved system, computer-readable medium and computer-implemented method for optimizing image and/or video compression for machine perception tasks.

Reference will now be made in detail to the exemplary embodiments, examples of which are illustrated in the accompanying drawings, therein like reference numerals reference to like elements throughout.

FIG. 1 illustrates a system 100 including a vehicle 110, a set of multiple sensors 120 of the vehicle 110, another vehicle 130, and a cloud environment 140. The set of multiple sensors 120 may include a camera, a LIDAR, a radar, a time-of-flight device and other sensors and devices that may be used for observing the environment of the vehicle 110.

The vehicle 110 may further comprise a processor configured to receive data from the multiple sensors 120 and to process the data before encoding the data. In one embodiment this data may be data from the camera sensor, though one of skill in the art will appreciate that the data may be from other sensors, such as, for example, a LIDAR, a radar, a time-of-flight device and other sensors and devices that may be used for observing the environment without departing from the scope of this disclosure. The vehicle 110 may further comprise a memory for saving the encoded images and video frames or other type of sensor data. In addition, the vehicle 110 may further comprise an autonomous driving system that may be communicatively coupled to the processor of the vehicle and that may receive the encoded image.

The autonomous driving system may use the encoded data for autonomously driving the vehicle 110. The vehicle 110 may comprise one or more further sensors, such as a distance sensor and a temperature sensor. The vehicle 110 may be further communicatively coupled to another vehicle 130 and/or a cloud environment 140. The multiple sensors 120 may be integrated anywhere in the vehicle 110 (e.g., next to a headlight, a rearview mirror, etc.) or may comprise sensors that can be attached and removed from the vehicle 110.

The other vehicle 130 may also comprise different sensors (not shown) for observing the environment, a processor, a memory, and/or an autonomous driving system. Likewise, the processor of the other vehicle 130 may also be configured to process an image by filtering the image before encoding the image, as described herein. The cloud environment 140 may include a cloud storage for storing the encoded image. The cloud environment 140, may be communicatively coupled to a remote driving system that may be used to control the vehicle 110 from remote by a remote driver. For example, the cloud environment may be communicatively coupled with the remote driving system via a cellular data network, a Wi-Fi network, a satellite internet access, or the like.

Figure 2:
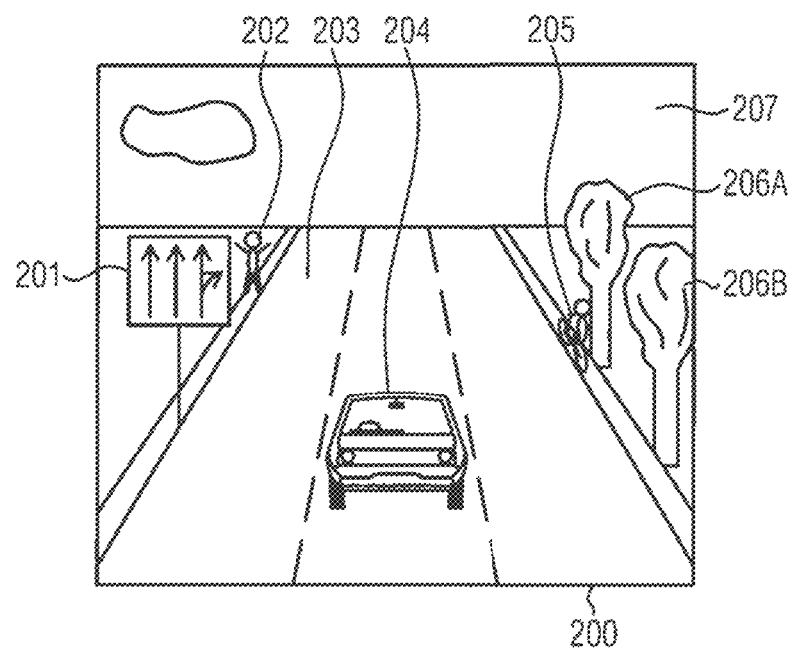
FIG. 2 illustrates an exemplary environment that may be dealt with a vehicle implementing the herein described concepts. The environment comprises an exemplary scene including a traffic sign, a pedestrian, a street, a vehicle, a cyclist, trees and sky.

FIG. 2 illustrates an exemplary environment 200 that may exist around the vehicle 110. The environment 200 may comprise one or more objects. The exemplary environment 200 of FIG. 2 illustrates several regions 201-207 that display several objects including a traffic sign 201, a pedestrian 202, a street 203, a car 204, a cyclist 205, two trees 206A, 206B and sky 207. It is apparent that it may be possible to define more regions comprising further objects such as cyclist way, lane marker, or cloud which are also present in environment 200.

The environment 200 may be a representative environment with which the disclosed systems and methods may be confronted. Notably, the vehicle 110 is depicted as a car, however, aspects disclosed herein are not limited to be implemented by cars, but also other systems, vehicles and devices may be used for implementing the herein disclosed concepts. Other examples of vehicles 110, for example, may be a drone or a delivery robot.

Consequently, the environment 200 may look quite different based on the vehicle 110 implementing the herein disclosed concepts. For example, in case of a drone, the environment 200 may comprise other drones and obstacles in the air, such as birds, wind turbines, buildings, aircrafts, etc. One of skill in the art will appreciate that the environment 200 depicted in FIG. 2 is for illustrative purposes and that the systems and methods disclosed herein may operate in any type of environment typical to the vehicle or device which incorporates aspects of the present disclosure.

The aspects disclosed herein provides, among other benefits, improvement of coding efficiency of the video encoding process for storage and transmission of video data. More specifically, the aspects disclosed herein are related to the dynamic detection/segmentation of various regions of varying importance in a video sequence and subsequently allocating different compression/quality factors to these regions.

Notably, detection of objects-of-interest, e.g. other vehicles, traffic lights, pedestrians, bicycles, lane/road markers, etc. in a video stream may be more important than objects like sky, vegetation or buildings etc. Therefore, not all of the objects in a video frame are of same importance and different compression/quality factors (depending upon the importance of the objects) may be chosen while compressing the video frame. According to the aspects disclosed herein important objects or regions of a video frame are encoded with lossless or high-quality encoding mode whereas the less important regions are compressed aggressively. ROI based compression in accordance with the aspects disclosed herein, significantly increases the encoding efficiency of standard based video codecs.

Different non-limiting examples of such object detection algorithms may include Fast R-CNN, Faster R-CNN, Histogram of Oriented Gradients (HOG), Region-based Convolutional Neural Networks (R-CNN), Region-based Fully Convolutional Network (R-FCN), Single Shot Detector (SSD), Spatial Pyramid Pooling (SPP-net), and/or YOLO (You Only Look Once). There may be further object detection algorithms that may be used in addition or instead of the above mentioned ones, however, the aspects disclosed herein are not limited to a specific object detection algorithms and different circumstances may prefer or require different algorithms.

Figure 3:
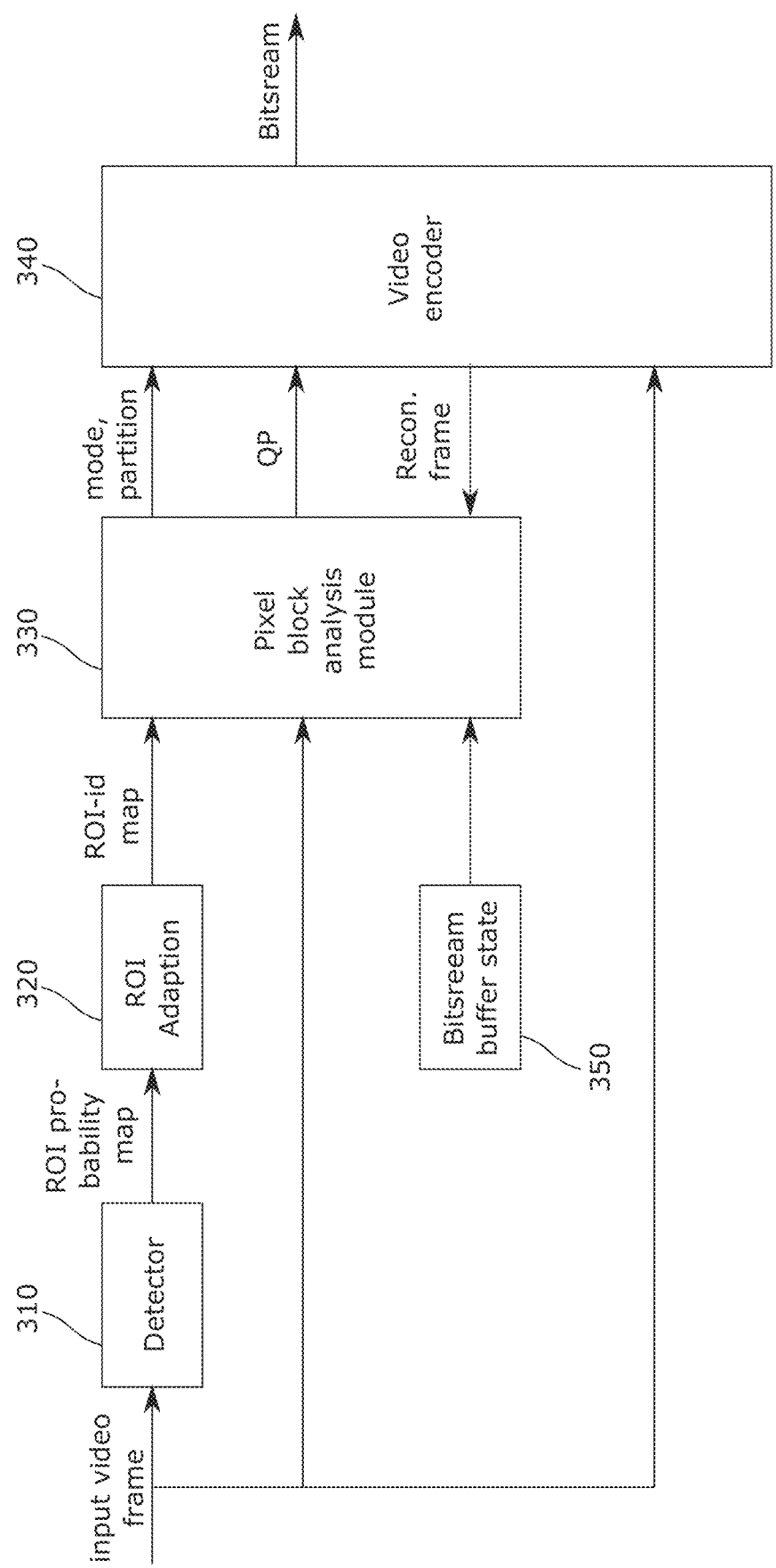
FIG. 3 provides a simplified schematic diagram illustrating the operational control flow framework for ROI-based video encoding, according to one embodiment.

A high-level schematic diagram is illustrated in FIG. 3. The basic building blocks include one or more detectors 310, such as trained machine learning (ML) based detectors, to detect one or more pre-defined objects-of-interest on video frames that are fed into the system.

Each of the detectors 310, or alternatively a subset of the detectors, may generate an ROI probability map, for example, at pixel level. These probability maps may be converted, by a ROI adaption module 320, into a single ROI-id map at pixel-block level. The adaptation process in 320 may be specific to the video codec standard that is used and may differ between HEVC, AVC and other standards, as each video coding standard supports a different set of partitions and a minimum pixel-block sizes, at which the quantization parameter of the video bitstream is interpreted.

Figure 4:
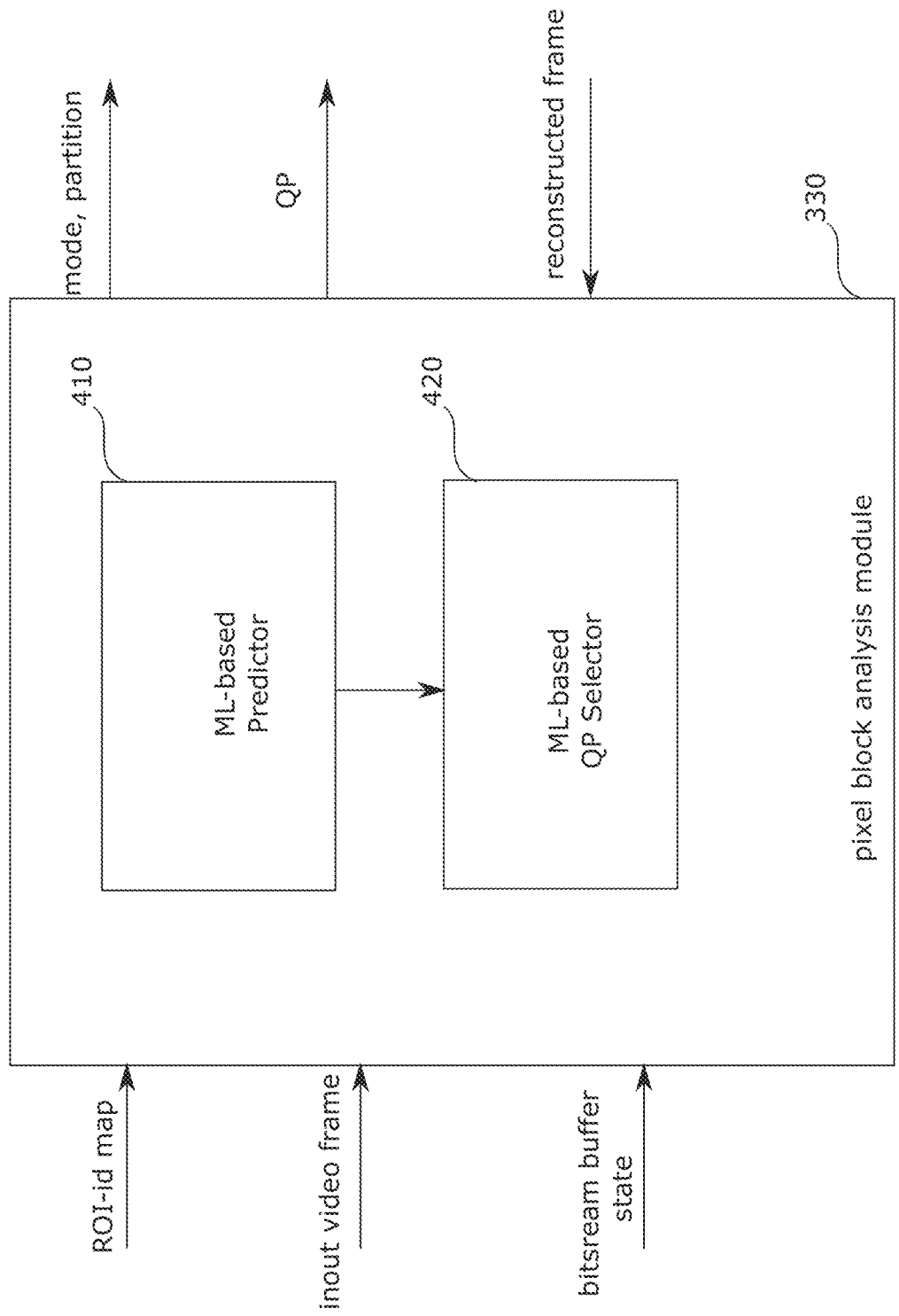
FIG. 4 provides a simplified schematic diagram illustrating the pixel block analysis module of FIG. 3.

As will be explained in more details below with regard to FIGS. 6 and 7 and as shown in FIG. 4, the pixel block analysis module 330 may include an ML-based Predictor 410 for determining a prediction mode and a partitioning scheme and an ML-based Quantization Parameter (QP) selector 420 for determining a quantization parameter value.

According to aspects of the present disclosure, the values for prediction mode, partition mode and quantization parameter are not determined by the encoder 340 itself, but are determined by the pixel block analysis module 330 and can be provided to the video encoder 340.

Figure 4A:
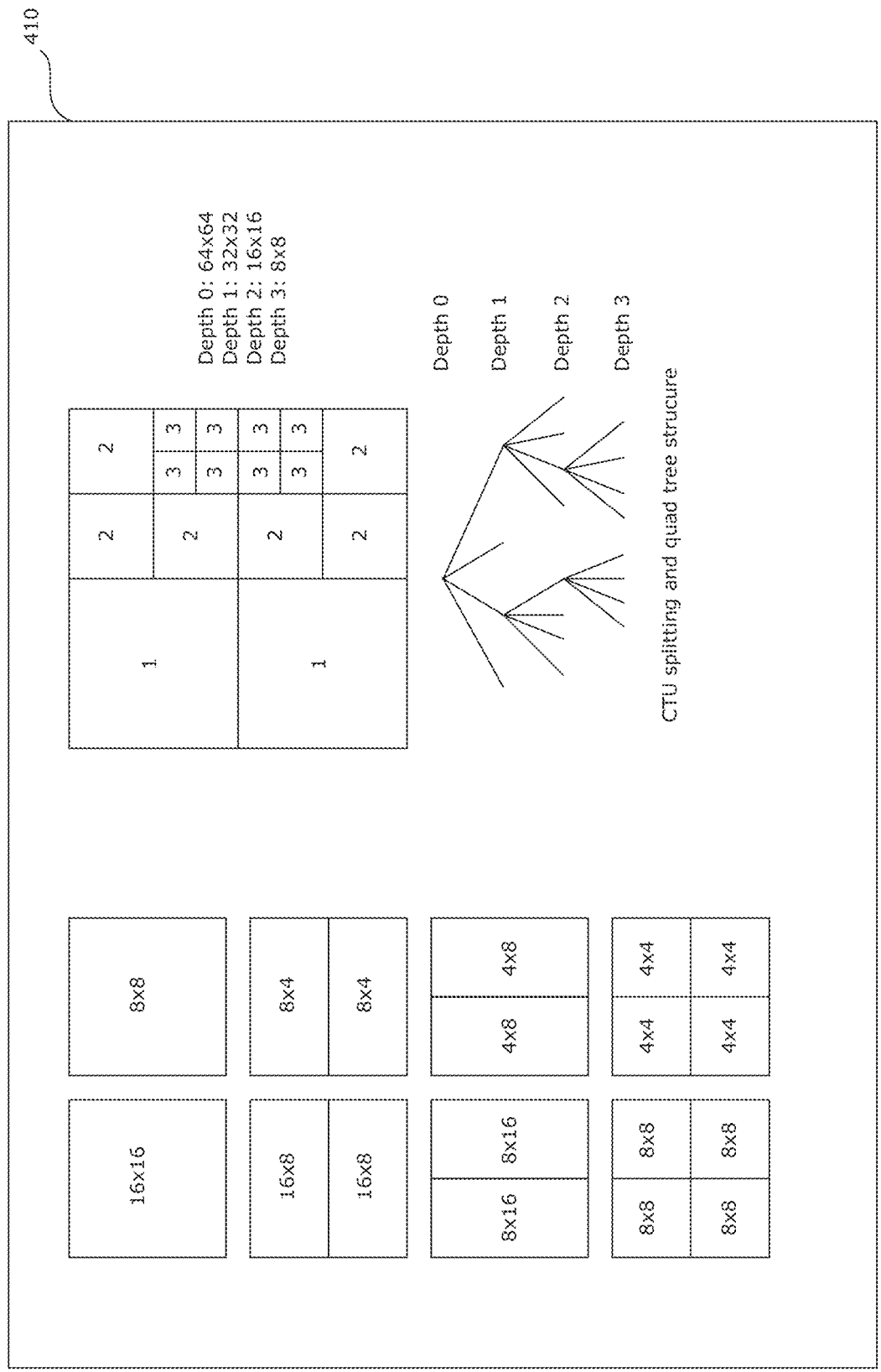
FIG. 4a illustrates an exemplary selection of pixel-block partitions within the pixel block analysis module as supported by some of the state-of-the-art video coding standard H.264/AVC and H.265/HEVC.

FIG. 4a shows an exemplary aspect of the disclosed concept, where the ML-based predictor 410 within the pixel block analysis module 330 determines a partitioning mode based on the given circumstances. As can be seen in FIG. 4a different partitioning schemes or pixel block segmentation schemes may be used, depending on whether HEVC or AVC is used as a video codec.

Similarly, the different video coding standards support a varying number of spatial prediction modes (Intra encoding modes) and/or and temporal prediction (Inter encoding) modes. For example, HEVC supports a total of 35 intra prediction modes (33 directional modes and 2 non-directional modes), while AVC only supports 9 prediction modes.

In the analysis module 330, the "cost" of the supported Intra/Inter prediction modes are estimated in terms of compression achieved (number-of-bits or bitstream size) and the corresponding distortion (quality). Based on this cost and the ROI coverage (percentage area of ROI in the video frame), the quantization parameter may be determined or computed for each pixel block. For example, a pixel block within an ROI may be compressed less aggressively than a pixel block that is not within the ROI. Further, different levels of compression may be applied to different ROIs, for example, depending upon the type and importance of the individual ROIs. The selected prediction mode and partition size, together with the suggested quantization parameter may be passed to the video encoder 340, where each pixel block is encoded according to the bitstream syntax of the given video coding standard.

Generally, video coding standards support a set of partitions, that is, pixels of a video frame can be grouped into partitions to capture the shape of objects and encode them accordingly. FIG. 4a provides two examples of pixel-block partitions supported by state-of-the-art video coding standard H.264/AVC and H.265/HEVC. To improve encoding performance while preserving target video quality in the ROI, pixel-blocks need to be aligned as per video coding standard requirement.

The normative specifications of video coding standards typically provide the bitstream syntax and the video decoding process to enable interoperability. In this respect, motion estimation and rate control algorithm in general falls outside the scope of the standardization process. Motion estimation and consequently, optimal predictor computation is typically the most compute-intensive module in any video encoder and, therefore, have a significant impact on the performance of the video encoder in terms of compression and latency. Similarly, a rate control module also plays an important role in determining the performance of a video encoder in terms of compression/quality tradeoff.

Figure 6:
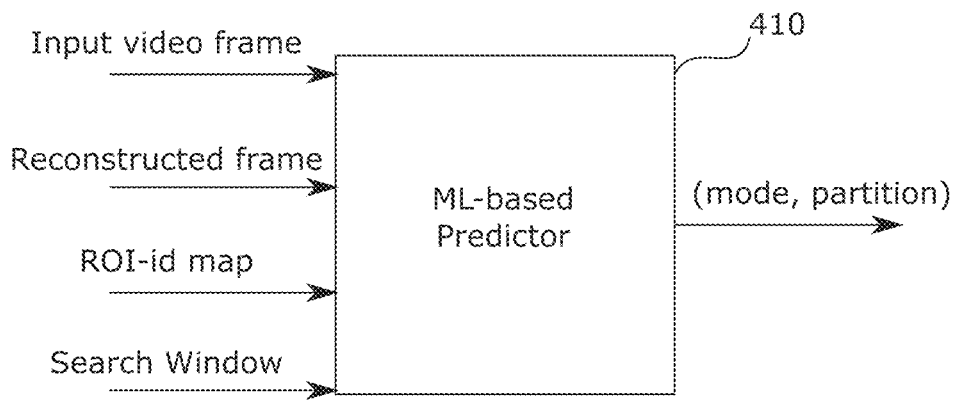
FIG. 6 Illustrates high-level selection process for encoding modes, pixel-block partitions and computation of quantization parameters for the pixel-blocks.

The pixel block analysis component 330 is further illustrated in FIG. 6, comprising an ML-based predictor 410. According to exemplary aspects disclosed herein, machine learning algorithms used for either object detection and classification or semantic segmentation models may be used for the ML-based predictor 410.

In general, there are three types of machine learning algorithms that may be used for the ML based predictor 410, comprising supervised learning, unsupervised learning and reinforced learning. In supervised learning, systems learn under supervision, where the supervision signal is named as target value or label. For example, in supervised learning, a goal may be to learn the mapping function, which refers to being able to understand how the input should be matched with output using available data. In unsupervised learning, such signal is not available. Examples of supervised learning algorithms may be Regression, Decision Tree, Random Forest, KNN, Logistic Regression etc.

An example for unsupervised machine learning may refer to dimensionality reduction where the goal is to reduce the number of random variables under consideration. In reinforced learning, the machine is trained to make specific decisions, where the machine is exposed to an environment where it trains itself continually using trial and error. Examples of Unsupervised Learning may be Apriori algorithm, K-means.

In reinforced learning, machine learns from past experience and tries to capture the best possible knowledge to make accurate business decisions. An example of reinforcement Learning may be Markov Decision Process.

In examples, the ML-based predictor 410 may receive inputs such as, but not limited to, the analyzed video frame, a reconstructed frame, a ROI-id map indication the locations of different regions of interest in the frame, and/or a search window. The search window may be an input to the ML-based predictor 410 that allows to specify one or more specific areas within an image frame. These one or more specific areas can be image portions to which the object detection is applied or focused on. For example, a search window may cover a portion of the image with higher relevance, such as a portion of the road that the vehicle is driving towards. The portion of the road in the driving direction is merely an example and different objects or portions are likewise possible. The specified search window can thereby ensure that the ML-based predictor 140 processes regions of interest within the search window, i.e. more important areas that are distinct from other regions of interest outside the search window, i.e. less important areas. According to an exemplary scenario, regions of interest within the search window may be processed such that the prediction mode and specifically the partitioning is selected such that less compression is performed and better image quality is achieved. According to another alternative example the search window can cover a portion of the image with lower relevance. While FIG. 6 is depicted as showing a specific set of inputs, one of skill in the art will appreciate that a subset of the depicted inputs may be provided to the ML-based predictor. Alternatively, or additionally, different inputs may be provided to the ML-based predictor without departing from the spirit of this disclosure. The pixel block analysis component 330 may employ motion estimation and rate control algorithms to evaluate the cost of the supported pixel-block partitions and choose best mode among them. To ensure target quality in the ROI, an average quantization parameter may be computed at slice level and further refined on the basis of complexity, brightness and activity of the pixel-block. An overview of this process is provided in FIG. 6. A further realization of the same analysis block 330 using ML-based algorithm is provided in FIG. 7.

As shown in FIG. 4, the ML-based predictor 410 and the ML-based QP selector 420 may be included in the pixel block analysis module. After the ML-based predictor 410 determines a preferred prediction mode and partitioning scheme, these details may be forwarded to the ML-based QP selector 420, where the QP is then determined at least partially based in the information from the ML-based predictor 410.

Figure 7:
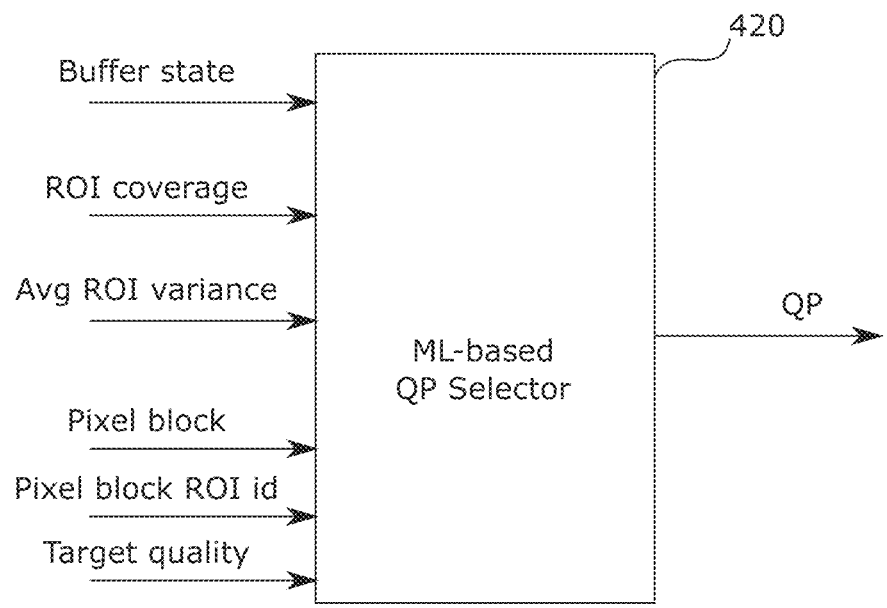
FIG. 7 provides another possible realization of high-level selection process for encoding modes, pixel-block partitions and computation of quantization parameters for the pixel-blocks using ML-based processing blocks.

As further shown in FIGS. 6 and 7, multiple parameters can be provided as inputs to the ML-based predictor 410 and the ML-based QP selector 420. For example, inputs provide to the ML-based predictor 410 may include, but are not limited to, an input video frame, a reconstructed video frame, and/or an ROI-id map. However, these inputs are not meant to be limiting and in some cases only a subset of the inputs may be used while in other cases additional inputs may be available and used.

According to aspects of the present disclosure, the machine learning algorithms used in the ML-based predictor 410 and the ML-based QP selector 420 may be identical. However, in some cases, it may be more effective to use different machine learning algorithms for the predictor 410 and the selector 420.

Figure 5:
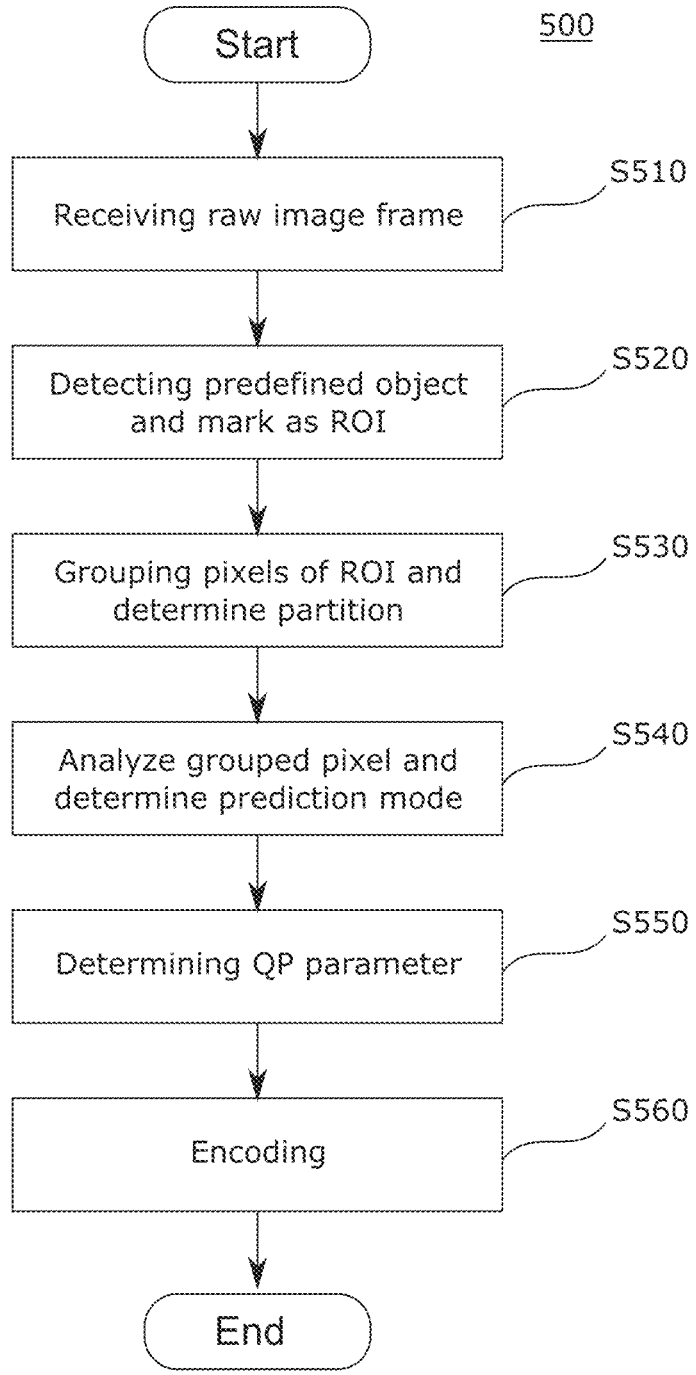
FIG. 5 illustrates a flow diagram for a method for optimizing image and/or video compression for machine perception.

FIG. 5 illustrates a computer-implemented method 500 for optimizing image and/or video compression for machine perception. The method 500 starts with step S510, where raw image frames are received from a camera sensor. The raw image frame may be part of a video stream, captured by a video camera mounted on a vehicle.

In step S520, one or more predefined objects in the raw image frame are detected and a region around the predefined object within the raw image frame is marked as ROI. As described above, different object detection algorithms may be available for this task. This may be done in an individual video frame received from the camera. In some examples, each video frame may be evaluated. In other examples, a subset of the video frames may be analyzed. For example, when travelling at high speeds it may be beneficial to evaluate each video frame received from the camera. However, when the vehicle is travelling at slower speeds, it may be possible to perform image detection on a subset of frames (e.g., ever 3rd frame, every 5th frame, etc.) thereby reducing computational needs without increasing the likelihood of missing an object. This step may include determining an ROI probability map for one or more objects of interest at pixel level, as previously discussed. A threshold may be applied to the ROI probability map in order to generate a binary mask at pixel level. The threshold may be chosen using a validation process, based on pre-determined precision/recall requirements depending on the situation or use case.

Continuing to step S530, pixels of the ROI are grouped into one or more pixel blocks according to a video coding standard. Further, a partitioning scheme is determined based on the grouping of the pixels of the ROI. For example, the pixels may be grouped into m×n pixel-blocks, according to supported partitioning schemes of the used video coding standard, and aligned with basic processing of pixel-blocks supported by the video decoder. A unique ROI-id may then be assigned to the ROIs at pixel-block level and a single ROI-id map at pixel level may be generated by merging all objects of interest.

The grouped pixels in the pixel-blocks are then analyzed in step S540 in order to determine an appropriate prediction mode for intra prediction or inter prediction for the grouped pixels. For example, pixel-blocks may be analyzed for a set of supported spatial (Intra) and temporal predictions (Inter) to find best prediction mode for each pixel-block. For example, a ML-based predictor 410, such as the predictor shown in FIG. 6, may be employed to determine the appropriate prediction mode.

In step S550, a quantization parameter for the grouped pixels is determined. The quantization parameter for the grouped pixels of the ROI yields less compression than a quantization parameter of a non-ROI. In other words, a quantization parameter may be computed for each pixel-block to preserve target quality in the ROI regions and aggressive compression elsewhere to meet the target bitrate. For almost lossless compression, a high value is chosen for the quantization parameter, resulting in a smaller quantization step size. In examples, a ML-based QP selector 420, such as the selector depicted in FIG. 7, may be employed to determine the quantization values as step S550. Alternatively, in examples, a single ML model may be used to determine both the prediction mode and the quantization values.

In step S560, after the partitioning, prediction mode and quantization parameters are identified, for example, by the pixel block analysis component 330 depicted in FIG. 3, one or more pixel blocks are encoded according to the bitstream syntax of the selected video codec.

The ROI-based video compression may support the following features: (i) support of irregular shaped ROIs, (ii) support of dynamic ROI processing, (iii) support of run-time detection of ROIs in a video sequence, (iv) ROI-based compression is agnostic to the video codec employed, (v) user provided ROI detectors can be integrated, (vi) ROI-based compression supports both constant bitrate (CBR) and constant quality (or variable bitrate: VBR) modes, (vii) support of user-defined quality metric, (viii) employment of custom motion estimation for different camera specific views (front, side, back).

According to another aspect, concepts for optimizing the image and video pre-processing methodology for the downstream machine vision tasks on images/videos is provided. Specifically, optimization is provided of the quantization tables along the further transformation which can be the commonly used DCT or a different data driven transformation as used in the compression algorithms for images (JPEG and similar lossy algorithms), and for videos (H.264 and other inspired lossy algorithms), for the downstream machine vision tasks.

Historically, quantization tables were based on human perception, thus leading to encoding lower spatial frequencies at higher qualities compared to higher spatial frequencies, and encoding luminance information at higher quality compared to the chromatic information. While this has led to compression rates of over 10× with little loss in perceptual quality, the effects on machine perception have been significant.

Machine vision has a considerable difference in performance with raw video compared to that of lossy compressed video streams. Particularly, this has been prominent in cases when the objects of interest are rather small, and thereby were highly affected by the loss in information in high spatial frequencies. Further effects of inter-frame coding are furthermore affecting negatively tracking schemes applied on the reconstructed frames, as such requiring a further optimization of such an inter frame scheme along the proposed intra-frame scheme. One of these many embodiments of an inter frame scheme are H.264 codec inter frame models.

As opposed to existing solutions, aspects and embodiments disclosed herein do not require a regression model for the final code length to be optimized. Instead, the compressed bitstream is directly yielded from the optimized quantization tables. In other words, existing solutions requires an estimate to optimize the bitrate, whereas some embodiments disclosed herein can optimize the q-tables without having an estimate of the bitrate enter the loss function.

To optimize the efficiency of machine perception, while also enabling the advantages of image/video compression, the concepts disclosed herein optimize the quantization matrices used in the image/video compression algorithms for the downstream machine perception tasks. Further aspects of the disclosure include the optimization of such quantization tables along a further trained transformation replacing the DCT transformation and enabling to extract suitable features as usable by ML schemes.

This method, for the chosen machine perception tasks such as object detection, scene prediction, time of interest estimation, etcetera, includes the compression algorithm into the optimization pipeline and jointly optimizes both the pre-processing elements (quantization matrices) and the parameters for the perception task.

Among other benefits, the advantages of the aspects disclosed herein include, but are not limited to:
1. It enables an optimal machine vision performance.
2. It enables higher compression rates, ensuring the level of compression is what's needed for the level of perception performance.
3. The compression format used could be any image/video compression codec with quantization used to achieve lossy compression, with well-studied decoding guarantees and established decoding schemes for human usage. This aspect distinguishes the proposed methodology against the purely machine learning based compression schemes, which need unique decoders for each encoding parameters and with no statistical guarantees available regarding the amount of information lost.

Specifically, the machine perception tasks are built based on machine learning algorithms, and are trained using gradient descent. The concepts described herein include the compression encoding and decoding into the training pipeline, and make use of a joint optimization approach through the addition of a unique compression loss, enabling the training of both the perception task while reducing the amount of data needed for training. The joint optimization scheme enables an easy trade-off of the task performance against the necessary data compression.

Figure 8:
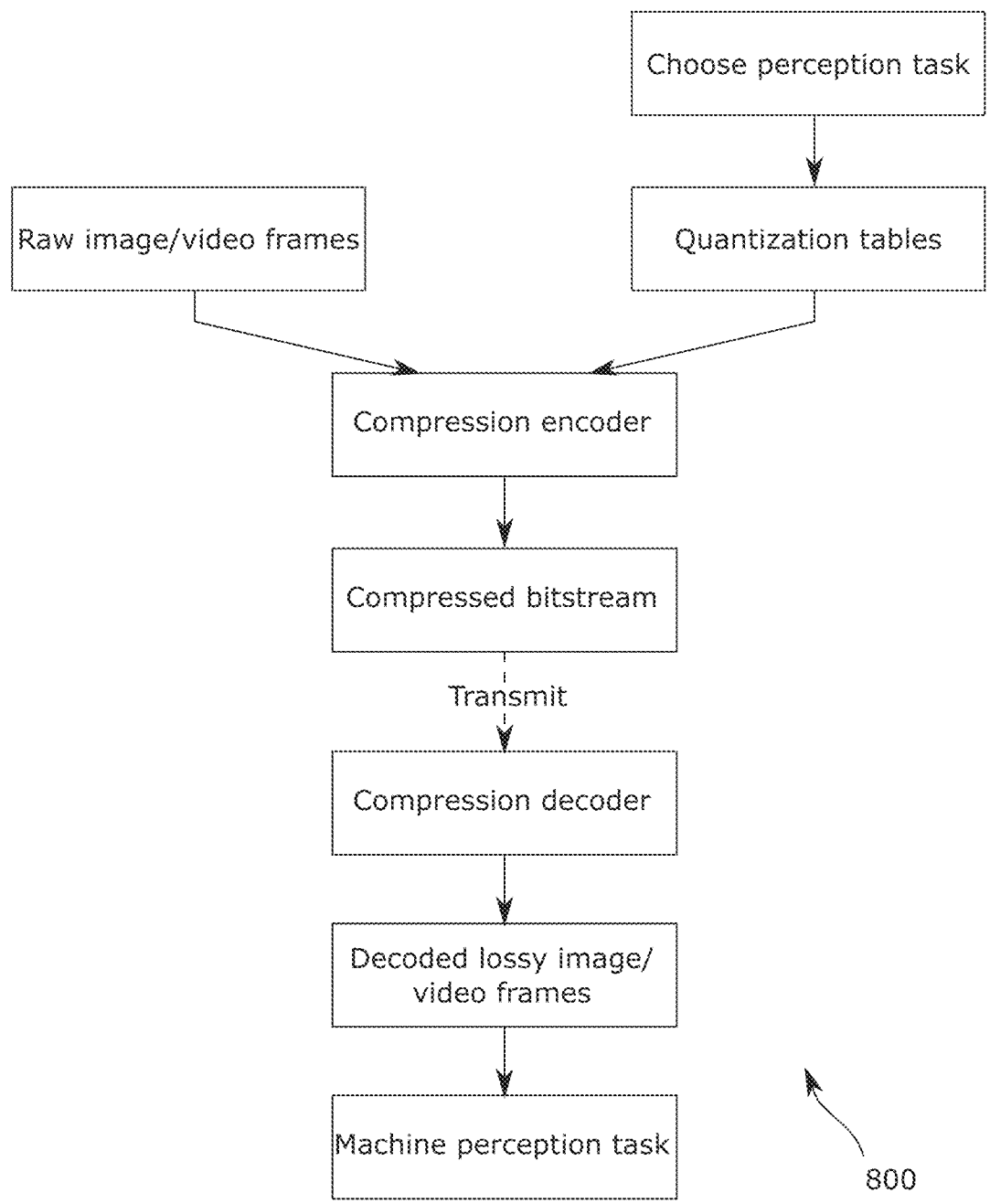
FIG. 8 illustrates a high-level pipeline scheme for inference usage.

For inference usage, the pipeline 800 used is shown in the flow chart of FIG. 8. At first, a perception task is chosen. Examples of such perception tasks or machine vision tasks may include semantic segmentation, object detection, time of interest estimation etc. The quantization tables depend on the perception task and therefore, based on the selected perception task, a corresponding quantization table is selected and provided to the compression encoder. The quantization table may be optimized jointly with the perception task. This means that the tables may themselves be tied to the perception task they are trained with. After choosing the perception task, the quantization may be picked appropriately. The compression encoder uses the quantization tables for compressing raw image and/or video frames. The compressed bit stream may then be transmitted for further processing. At the decoder side, the compressed bit stream is received and decoded. After decoding, the machine perception task is performed. For decoding, the same quantization tables as for encoding are used.

Notably, such a pipeline can be further extended by a training loop of an optimized feature extraction scheme replacing DCT and as usable to feed in directly into a particular machine learning model such as SVMs to obtain a classification output. The same results may be obtained for either classification or segmentation schemes with classification rates improved by more than 20%, single pixel segmentation rates improved by even 50% at the same bitrate. The optimization for a segmentation or a classification scheme can be tuned accordingly in the methodology described below.

Figure 9:
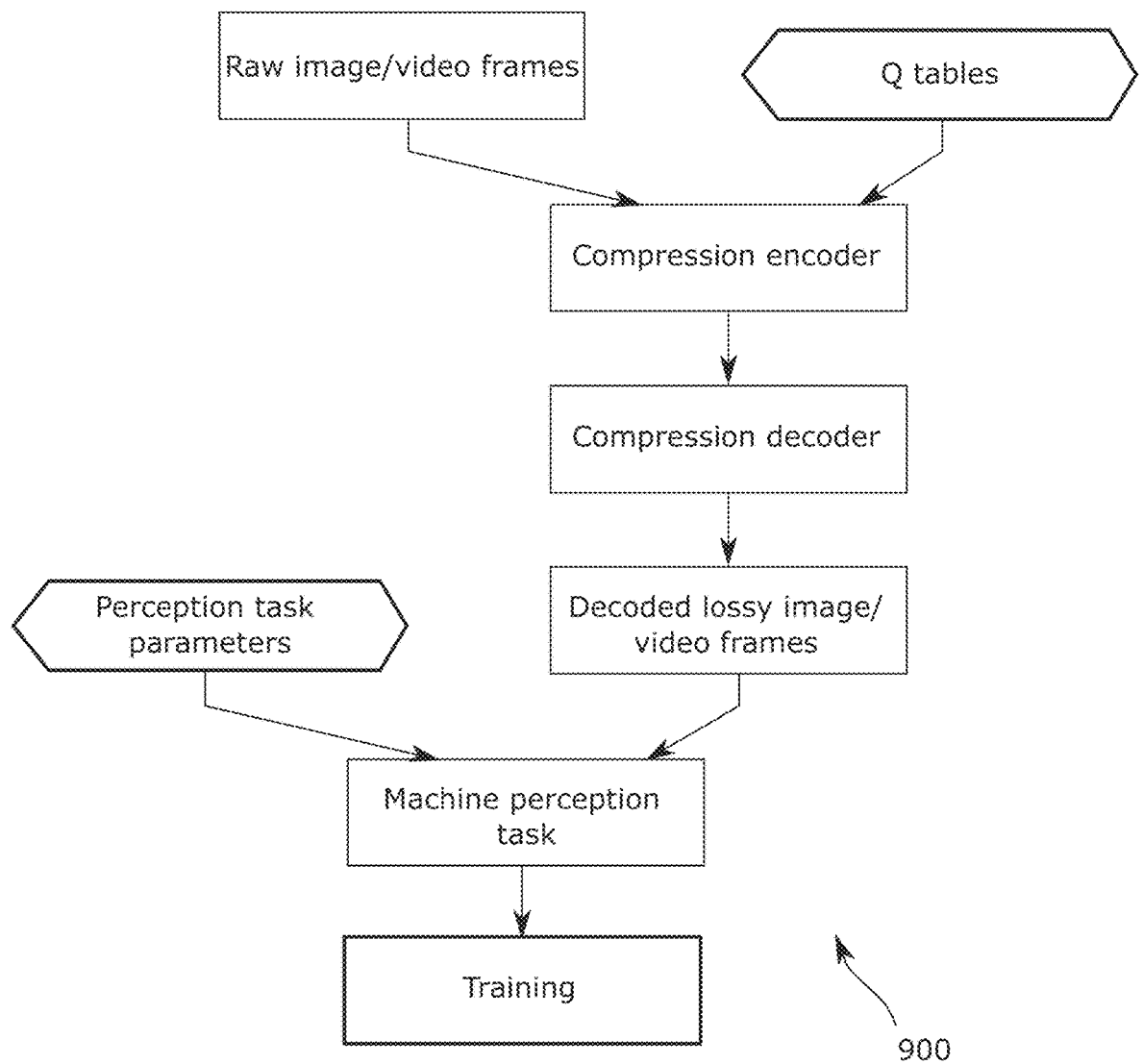
FIG. 9 illustrates a high-level pipeline training scheme.

Training the pipeline 900 used is shown in FIG. 9. The optimized quantization scheme works on top of a machine vision task, such as semantic segmentation, object detection, time of interest detection, etc. The scheme disclosed herein is independent of the downstream task and works on top of any machine vision task.

Examples of models optimized with such a training methodology are for example Fast Convolutional Neural Network (CNN), segmentation and classification schemes. The methodology can be further applied to further state-of-the-art ML models such as Yolo, etc. with similar results.

According to embodiments, the machine vision task is trained using cost function optimization, and the proposed scheme modifies the objective function of the chosen task that is to be minimized, by adding additional terms that correspond to the optimization of the quantization tables in the image/video encoder-decoder.

Figure 10:
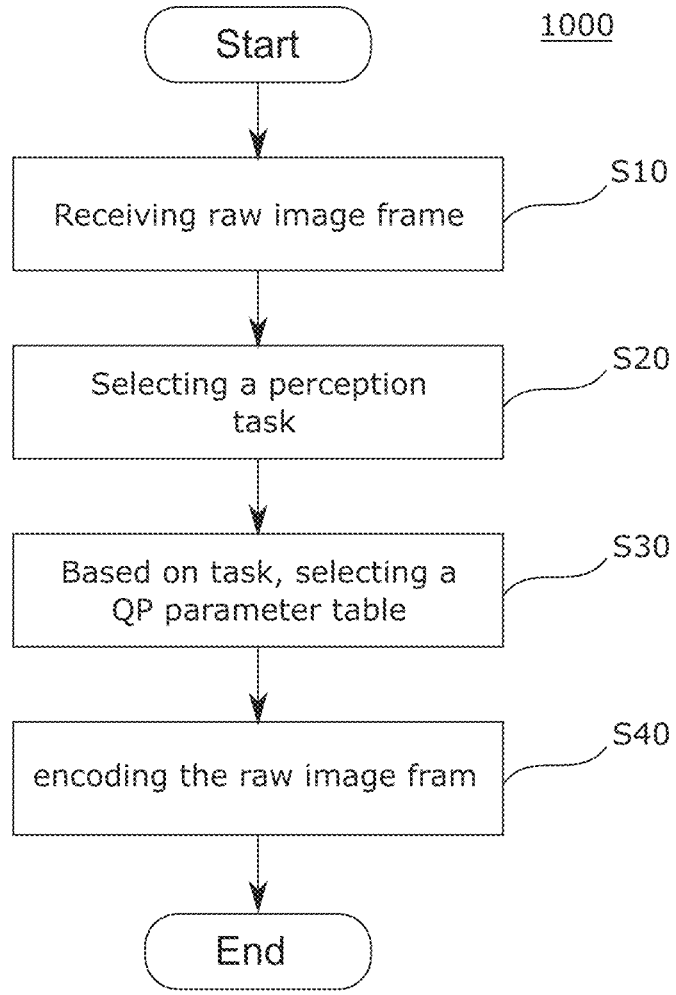
FIG. 10 illustrates a flow diagram for a method for optimizing image and/or video compression for machine perception.

FIG. 10 is a flow diagram showing a method 1000 for optimizing image and/or video compression for machine perception. The method 1000 starts with step S10, where a raw image or video frame from a camera sensor is received.

In step S20 a perception task (also referred to herein as machine vision task) to be performed is selected.

Based on the selected perception task, a quantization parameter table used for compressing and encoding the raw image or video frame is selected in step S30.

Finally, in step S40, the raw image or video frame is encoded using the selected quantization parameter table. The selection of the quantization parameter table may be based on training of the selected machine vision task using cost function optimization.

As stated above, the objective function of the chosen task that is to be minimized is modified by adding additional terms that correspond to the optimization of the quantization tables in the image/video encoder-decoder. The description of the additional terms to the objective function may be as below.

Given that the $\mathcal{L}_{task}$ is the objective function corresponding to the machine vision task, the combined objective function based on our proposed scheme is as follows:

$$\mathcal{L} = \mathcal{L}_{task} + \lambda \sqrt{\frac{1}{\|Q_c\|^2} + \frac{1}{\|Q_l\|^2}}$$

The parameter $Q_c$ is the quantization table for the chroma channel, $Q_l$ is the quantization table for the luma channel, and $\lambda$ is a hyper parameter which controls the level of compression needed vs the performance. The $\lambda$ parameter enables a control mechanism to maintain a balance between the necessary levels of task performance and the required compression rate. Increasing the parameter leads to higher compression levels at the expense of a slight loss in task performance, while decreasing the parameter leads to higher task performance at the expense of a slightly lower compression levels.

Figure 11:
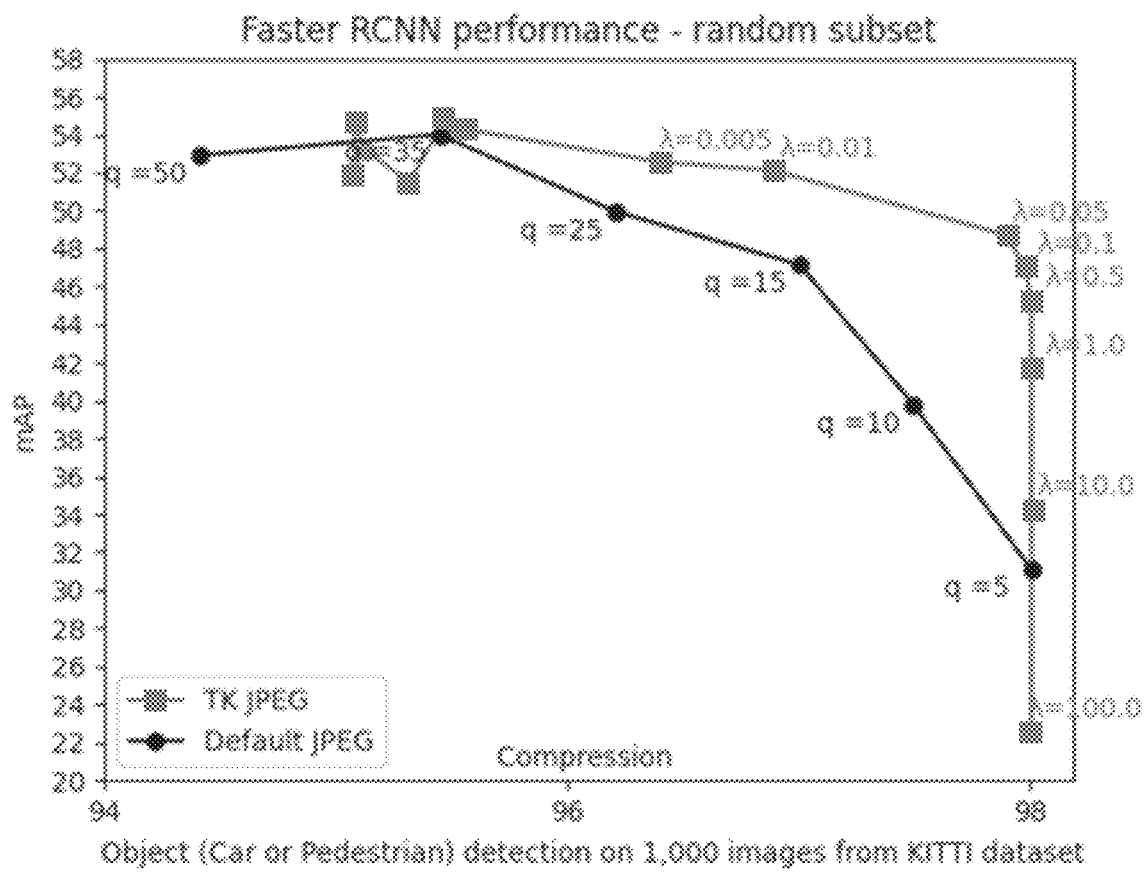
FIG. 11 illustrates an exemplary diagram of Faster R-CNN performance based on a random subset of 1000 images from the KITTI dataset.

FIG. 11 shows an exemplary diagram of Faster R-CNN performance based on a random subset of 1000 images from the KITTI dataset.

To further control differing levels of compression, the luma channels can be compressed to a lower levels while the chroma channels can be compressed to a higher levels:

$$\mathcal{L} = \mathcal{L}_{task} + \sqrt{\lambda_c^2 \frac{1}{\|Q_c\|^2} + \lambda_l^2 \frac{1}{\|Q_l\|^2}}$$

The $\lambda_c$ and $\lambda_l$ are hyper parameters that control the level of chroma and luma compression levels.

Such a loss function achieves a high level of compression while maintaining an optimal level of task performance. While that is desirable in a purely machine vision setting, a joint optimization for human vision and machine vision is also an interesting outcome. To achieve the joint optimization, the loss function is further modified by using a weighted norm of the quantization table, with higher weights given to the high frequency components so as to reduce them further compared to the low frequency components.

$$\mathcal{L} = \mathcal{L}_{task} + \sqrt{\lambda_c^2 \frac{1}{\|W_c \cdot Q_c\|^2} + \lambda_l^2 \frac{1}{\|W_l \cdot Q_l\|^2}}$$

The parameters $W_c$ and $W_l$ are the weight matrices that are used to ensure that there's a greater focus on quantizing high frequency components. While $W_c$ and $W_l$ can be carefully fine-tuned, a simpler initialization of these weight matrices work towards ensuring a balance of human vision and machine vision optimization:

$$W^{i,j} = \frac{1}{i+j}$$

With the modified objective function, the scheme could use any objective function minimization, such as the more popularly used gradient descent or LBFGS, to learn on both the vision task and the quantization tables needed to solve the task in an optimal fashion.

According to a further aspect, optimization is provided for the transformation parameters (yielding the coefficients) alongside with a machine learning task (e.g. SVM or a neural network used for classification, or a CNN used for object detection or image segmentation, etc.) working on the transformed data.

That is, in contrast to the methodology described above in which the ML task operates on the decoded lossy image data, the ML task is optimized and operates in the transformed (encoded) data space. The advantage being that no transformation back to the input space needs to be done, thereby reducing latency. Further latency reduction is achieved by applying the ML-task on smaller input data, since the ML-model operates in the transformed space and not the decoded image space. Hence, the inference requires less computational resources: First, by skipping the decoding step and second, by operating on optimized feature representations in the transformed space leading to an overall reduction of data size inserted into the trained ML-model. The transformation (e.g. DCT, DWT) is optimized to yield a certain level of performance for the given ML-task, but also to require a smaller bitrate per input object (image). Furthermore, by operating in the optimized transformed data space the ML-model's hyper parameters can be chosen to run very efficiently (e.g. a very shallow and narrow neural network architecture) yielding low latency. The methodology here only describes the optimization of a given ML-model, not the optimization of the hyper parameters. The advantage of this methodology is that several application relevant objectives (ML-task performance, ML-task latency and bitrate) can be weighted and controlled using the optimization methodology described here to allow deployment in different fields of applications. For example, a model optimized for low-latency and low bitrate optimized (but moderate ML-performance) can run on embedded devices, whereas a model optimized for ML-performance (e.g. maximum accuracy, or minimal false-negative-rate) and low bitrate, but not focusing on low latency is better suited for web- or cloud-based environments.

Figure 12:
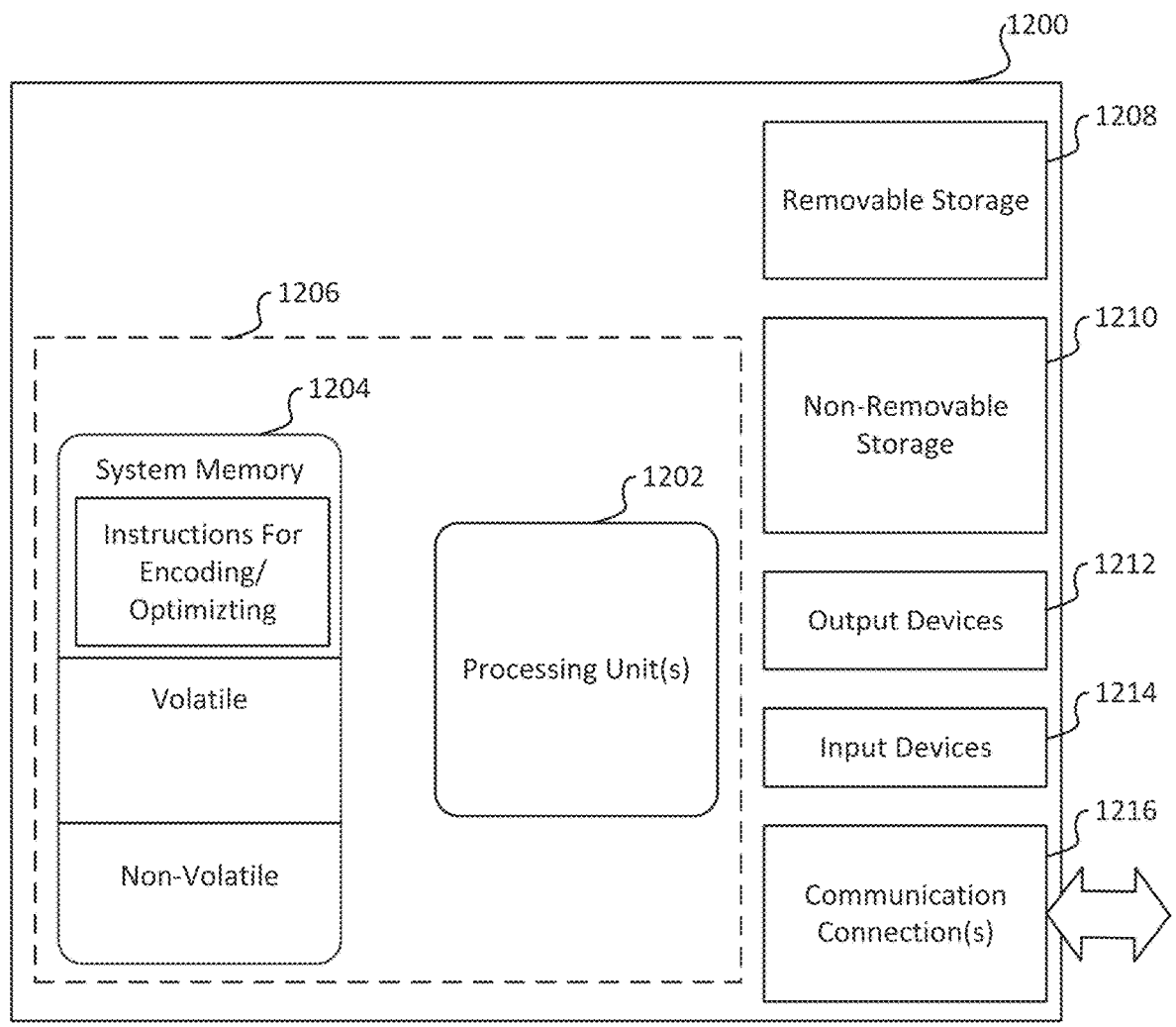
FIG. 12 is a block diagram illustrating example physical components of a computing device with which aspects of the disclosure may be practiced.

FIG. 12 illustrates a simplified block diagram of a device with which aspects of the present disclosure may be practiced in accordance with aspects of the present disclosure. The device may be a server computer, a mobile computing device, or a set-top-box, for example. One or more of the present embodiments may be implemented in an operating environment 1200. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 1200 typically includes at least one processing unit 1202 and memory 1204. Depending on the exact configuration and type of computing device, memory 1204 (instructions for encoding and/or optimizing as disclosed herein) may be volatile (such as RAM), non-volatile (such as ROM, flash memory, etc.), or some combination of the two. This most basic configuration is illustrated in FIG. 12 by dashed line 1206. Further, the operating environment 1200 may also include storage devices (removable, 1208, and/or non-removable, 1210) including, but not limited to, magnetic or optical disks or tape. In some aspects, the removable storage 1208 includes a subscriber card (e.g., a smart card and a subscriber identification module (SIM) card) Similarly, the operating environment 1200 may also have input device(s) 1214 such as remote controller, keyboard, mouse, pen, voice input, on-board sensors, etc. and/or output device(s) 1216 such as a display, speakers, printer, motors, etc. Also included in the environment may be one or more communication connections, 1212, such as LAN, WAN, a near-field communications network, a cellular broadband network, point to point, etc.

Operating environment 1200 typically includes at least some form of computer readable media. Computer readable media can be any available media that can be accessed by processing unit 1202 or other devices comprising the operating environment. By way of example, and not limitation, computer readable media may comprise computer storage media and communication media. Computer storage media includes volatile and nonvolatile, removable and non-removable non-transitory media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 1200 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

According to the aspects of the present disclosure, a computer-implemented method for optimizing image and/or video compression for machine perception comprises receiving a raw image frame from a camera sensor. The raw image frame is part of a video stream. The method further comprises detecting a predefined object in the raw image frame and marking a region around the predefined object within the raw image frame as ROI; grouping pixels of the ROI into one or more pixel blocks according to a video coding standard and determining a partitioning scheme based on the grouping of the pixels of the ROI; analyzing the grouped pixels in order to determine an appropriate prediction mode for intra prediction or inter prediction for the grouped pixels; determining a quantization parameter for the grouped pixels; encoding, using the video coding standard, the raw image frame based on the determined partitioning scheme, the determined prediction mode, and the determined quantization parameter. The quantization parameter for the grouped pixels of the ROI yields less compression than a quantization parameter of a non-ROI.

According to an embodiment, the video coding standard is one of H.264, H.265, H.266, VP9, and AV1.

According to an embodiment, the quantization parameter for the ROI provides lossless or high-quality encoding.

According to an embodiment, detecting a predefined object in the raw image frame is performed by a machine learning, ML, based detector and further comprises generating a probability map on pixel level; and converting the probability map into a single ROI-id map at pixel block level.

According to an embodiment, a cost of supported intra or inter prediction modes is estimated in terms of compression achieved and the corresponding distortion, and wherein the quantization parameter is determined for each pixel block based on said cost and ROI coverage.

According to an embodiment, in order to ensure a target quality in the ROI, an average quantization parameter is computed at slice level and is further refined on the basis of complexity, brightness and activity of the pixel block.

According to the aspects of the present disclosure, a computer-implemented method for optimizing image and/or video compression for machine perception comprises receiving a raw image or video frame from a camera sensor; selecting a machine vision task to be performed; based on the selected machine vision task, selecting a quantization parameter table used for compressing and encoding the raw image or video frame; and encoding the raw image or video frame using the selected quantization parameter table. The selection of the quantization parameter table is based on training of the selected machine vision task using cost function optimization.

According to an embodiment, training of a machine vision task using cost function optimization comprises modifying an objective function of the machine vision task that is to be minimized, by adding additional terms that correspond to optimization of a quantization parameter table in the image or video encoder.

According to an embodiment, a combined objective function to be minimized is given by:

$$\mathcal{L} = \mathcal{L}_{task} + \lambda \sqrt{\frac{1}{\|Q_c\|^2} + \frac{1}{\|Q_l\|^2}}$$

$\mathcal{L}_{task}$ is the objective function corresponding to the machine vision task, $Q_c$ is a quantization table for a chroma channel, $Q_l$ is a quantization table for a luma channel, and $\lambda$ is a parameter for enabling a control mechanism to maintain a balance between necessary levels of task performance and required compression rate.

According to an embodiment, a combined objective function to be minimized is given by:

$$\mathcal{L} = \mathcal{L}_{task} + \sqrt{\lambda_c^2 \frac{1}{\|Q_c\|^2} + \lambda_l^2 \frac{1}{\|Q_l\|^2}}$$

$L_{task}$ is the objective function corresponding to the machine vision task, $Q_c$ is a quantization table for a chroma channel, $Q_l$ is a quantization table for a luma channel, and $\lambda_c$ and $\lambda_l$ are hyper parameters for controlling levels of chroma and luma compression level, respectively, and wherein the luma channel is compressed to a lower level while the chroma channels is compressed to a higher level.

According to an embodiment, a combined objective function to be minimized is given by:

$$\mathcal{L} = \mathcal{L}_{task} + \sqrt{\lambda_c^2 \frac{1}{\|W_c \cdot Q_c\|^2} + \lambda_l^2 \frac{1}{\|W_l \cdot Q_l\|^2}}$$

$\mathcal{L}_{task}$ is the objective function corresponding to the machine vision task, $Q_c$ is a quantization table for a chroma channel, $Q_l$ is a quantization table for a luma channel, $W_c$ and $W_l$ are weight matrices for ensuring optimizing quantizing of high frequency components, and $\lambda_c$ and $\lambda_l$ are hyper parameters for controlling levels of chroma and luma compression level, respectively.

According to an embodiment, the method further comprises optimizing a transformation parameter for enabling performing the machine vision task to be performed on the encoded image or video data.

According to an embodiment, the method is implemented in an autonomous driving system, remote driving system and/or advanced driver assistance system.

According to the aspects of the present disclosure, any of the above methods may be implemented in a video pre-processing system for optimizing image and/or video compression for machine perception.

According to the aspects of the present disclosure, a computer-readable medium is provided, comprising computer-readable instructions, that, when executed by a processor, cause the processor to perform any one of the above methods.

The above described embodiments can be combined with each other. The above described embodiments may also be implemented on a computer-readable medium comprising computer-readable instructions, that, when executed by a processor, cause the processor to perform the above described steps.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for optimizing image and/or video compression for machine perception, the method comprising:
   receiving a raw image or video frame from a camera sensor;
   selecting a machine vision task to be performed;
   based on the selected machine vision task, selecting a quantization parameter table used for compressing and encoding the raw image or video frame; and
   encoding the raw image or video frame using the selected quantization parameter table;
   wherein selection of the quantization parameter table is based on training of the selected machine vision task using cost function optimization.

2. The computer-implemented method of claim 1, wherein training of a machine vision task using cost function optimization comprises modifying an objective function of the machine vision task that is to be minimized, by adding additional terms that correspond to optimization of a quantization parameter table in the image or video encoder.

3. The computer-implemented method of claim 2, wherein a combined objective function to be minimized is given by:

$$\mathcal{L} = \mathcal{L}_{task} + \lambda \sqrt{\frac{1}{\|Q_c\|^2} + \frac{1}{\|Q_l\|^2}}$$

wherein $\mathcal{L}_{task}$ is the objective function corresponding to the machine vision task, $Q_c$ is a quantization table for a chroma channel, $Q_l$ is a quantization table for a luma channel, and $\lambda$ is a parameter for enabling a control mechanism to maintain a balance between necessary levels of task performance and required compression rate.

4. The computer-implemented method of claim 2, wherein a combined objective function to be minimized is given by:

$$\mathcal{L} = \mathcal{L}_{task} + \sqrt{\lambda_c^2 \frac{1}{\|Q_c\|^2} + \lambda_l^2 \frac{1}{\|Q_l\|^2}}$$

wherein $\mathcal{L}_{task}$ is the objective function corresponding to the machine vision task, $Q_c$ is a quantization table for a chroma channel, $Q_l$ is a quantization table for a luma channel, and $\lambda_c$ and $\lambda_l$ are hyper parameters for controlling levels of chroma and luma compression level, respectively, and wherein the luma channel is compressed to a lower level while the chroma channels is compressed to a higher level.

5. The computer-implemented method of claim 2, wherein a combined objective function to be minimized is given by:

$$\mathcal{L} = \mathcal{L}_{task} + \sqrt{\lambda_c^2 \frac{1}{\|W_c \cdot Q_c\|^2} + \lambda_l^2 \frac{1}{\|W_l \cdot Q_l\|^2}}$$

wherein $\mathcal{L}_{task}$ is the objective function corresponding to the machine vision task, $Q_c$ is a quantization table for a chroma channel, $Q_l$ is a quantization table for a luma channel, $W_c$ and $W_l$ are weight matrices for ensuring optimizing quantizing of high frequency components, and $\lambda_c$ and $\lambda_l$ are hyper parameters for controlling levels of chroma and luma compression level, respectively.

6. The computer-implemented method of claim 1, further comprising optimizing a transformation parameter for enabling performing the machine vision task to be performed on the encoded image or video data.

7. The computer-implemented method of claim 1, wherein the method is implemented in an autonomous driving system, remote driving system and/or advanced driver assistance system.

8. A computer-readable medium comprising computer-readable instructions, that, when executed by at least one processor, cause the at least one processor to perform a method, the method comprising:
receiving a raw image or video frame from a camera sensor;
selecting a machine vision task to be performed;
based on the selected machine vision task, selecting a quantization parameter table used for compressing and encoding the raw image or video frame; and
encoding the raw image or video frame using the selected quantization parameter table;
wherein selection of the quantization parameter table is based on training of the selected machine vision task using cost function optimization.

9. The computer-readable medium of claim 8, wherein training of a machine vision task using cost function optimization comprises modifying an objective function of the machine vision task that is to be minimized, by adding additional terms that correspond to optimization of a quantization parameter table in the image or video encoder.

10. The computer-readable medium of claim 9, wherein a combined objective function to be minimized is given by:

$$\mathcal{L} = \mathcal{L}_{task} + \lambda \sqrt{\frac{1}{\|Q_c\|^2} + \frac{1}{\|Q_l\|^2}}$$

wherein $\mathcal{L}_{task}$ is the objective function corresponding to the machine vision task, $Q_c$ is a quantization table for a chroma channel, $Q_l$ is a quantization table for a luma channel, and $\lambda$ is a parameter for enabling a control mechanism to maintain a balance between necessary levels of task performance and required compression rate.

11. The computer-readable medium of claim 9, wherein a combined objective function to be minimized is given by:

$$\mathcal{L} = \mathcal{L}_{task} + \sqrt{\lambda_c^2 \frac{1}{\|Q_c\|^2} + \lambda_l^2 \frac{1}{\|Q_l\|^2}}$$

wherein $\mathcal{L}_{task}$ is the objective function corresponding to the machine vision task, $Q_c$ is a quantization table for a chroma channel, $Q_l$ is a quantization table for a luma channel, and $\lambda_c$ and $\lambda_l$ are hyper parameters for controlling levels of chroma and luma compression level, respectively, and wherein the luma channel is compressed to a lower level while the chroma channels is compressed to a higher level.

12. The computer-readable medium of claim 9, wherein a combined objective function to be minimized is given by:

$$\mathcal{L} = \mathcal{L}_{task} + \sqrt{\lambda_c^2 \frac{1}{\|W_c \cdot Q_c\|^2} + \lambda_l^2 \frac{1}{\|W_l \cdot Q_l\|^2}}$$

wherein $\mathcal{L}_{task}$ is the objective function corresponding to the machine vision task, $Q_c$ is a quantization table for a chroma channel, $Q_l$ is a quantization table for a luma channel, $W_c$ and $W_l$ are weight matrices for ensuring optimizing quantizing of high frequency components, and $\lambda_c$ and $\lambda_l$ are hyper parameters for controlling levels of chroma and luma compression level, respectively.

13. The computer-readable medium of claim 8, further comprising optimizing a transformation parameter for enabling performing the machine vision task to be performed on the encoded image or video data.

14. An image/video pre-processing system for optimizing image and/or video compression for machine perception, the image/video pre-processing system being configured to:
receive a raw image or video frame from a camera sensor;
select a machine vision task to be performed;
based on the selected machine vision task, select a quantization parameter table used for compressing and encoding the raw image or video frame; and
encode the raw image or video frame using the selected quantization parameter table;
wherein selection of the quantization parameter table is based on training of the selected machine vision task using cost function optimization.

15. The image/video pre-processing system of claim 14, wherein training of a machine vision task using cost function optimization comprises modifying an objective function of the machine vision task that is to be minimized, by adding additional terms that correspond to optimization of a quantization parameter table in the image or video encoder.

16. The computer-implemented method of claim 15, wherein a combined objective function to be minimized is given by:

$$\mathcal{L} = \mathcal{L}_{task} + \lambda \sqrt{\frac{1}{\|Q_c\|^2} + \frac{1}{\|Q_l\|^2}}$$

wherein $\mathcal{L}_{task}$ is the objective function corresponding to the machine vision task, $Q_c$ is a quantization table for a chroma channel, $Q_l$ is a quantization table for a luma channel, and $\lambda$ is a parameter for enabling a control mechanism to maintain a balance between necessary levels of task performance and required compression rate.

17. The computer-implemented method of claim 15, wherein a combined objective function to be minimized is given by:

$$\mathcal{L} = \mathcal{L}_{task} + \sqrt{\lambda_c^2 \frac{1}{\|Q_c\|^2} + \lambda_l^2 \frac{1}{\|Q_l\|^2}}$$

wherein $\mathcal{L}_{task}$ is the objective function corresponding to the machine vision task, $Q_c$ is a quantization table for a chroma channel, $Q_l$ is a quantization table for a luma channel, and $\lambda_c$ and $\lambda_l$ are hyper parameters for controlling levels of chroma and luma compression level, respectively, and wherein the luma channel is compressed to a lower level while the chroma channels is compressed to a higher level.

18. The computer-implemented method of claim 15, wherein a combined objective function to be minimized is given by:

$$\mathcal{L} = \mathcal{L}_{task} + \sqrt{\lambda_c^2 \frac{1}{\|W_c \cdot Q_c\|^2} + \lambda_l^2 \frac{1}{\|W_l \cdot Q_l\|^2}}$$

wherein $\mathcal{L}_{task}$ is the objective function corresponding to the machine vision task, $Q_c$ is a quantization table for a chroma channel, $Q_l$ is a quantization table for a luma channel, $W_c$ and $W_l$ are weight matrices for ensuring optimizing quantizing of high frequency components, and $\lambda_c$ and $\lambda_l$ are hyper parameters for controlling levels of chroma and luma compression level, respectively.

19. The computer-implemented method of claim 14, further comprising optimizing a transformation parameter for enabling performing the machine vision task to be performed on the encoded image or video data.

20. The computer-implemented method of claim 14, wherein the method is implemented in an autonomous driving system, remote driving system and/or advanced driver assistance system.

* * * * *